United States Patent [19]

Mehrgardt et al.

[11] Patent Number: 4,827,442

[45] Date of Patent: May 2, 1989

[54] DIGITAL CIRCUIT FOR SIMULTANEOUSLY GENERATING DIGITAL SINE- AND COSINE-FUNCTION VALUES

[75] Inventors: Soenke Mehrgardt, March; Heinrich Schemmann, Bonn, both of Fed. Rep. of Germany

[73] Assignee: Deutsche ITT Industries GmbH, Freiburg, Fed. Rep. of Germany

[21] Appl. No.: 94,466

[22] Filed: Sep. 8, 1987

[30] Foreign Application Priority Data

Sep. 11, 1986 [EP] European Pat. Off. ........ 86112597.9

[51] Int. Cl.$^4$ ............................................. G06F 1/02
[52] U.S. Cl. .................................................. 364/721
[58] Field of Search .............. 364/721, 718, 603, 817, 364/729

[56] References Cited

U.S. PATENT DOCUMENTS

| | | | |
|---|---|---|---|
| 3,633,017 | 1/1972 | Crooke | 364/721 |
| 3,735,110 | 5/1973 | LeComte | 364/729 |
| 3,824,498 | 7/1974 | McBride | 332/9 R |
| 3,898,446 | 8/1975 | Vatz | 364/721 |
| 4,024,385 | 5/1977 | Richards | 364/721 X |
| 4,159,527 | 6/1979 | Yahata | 15/34 |
| 4,562,460 | 12/1985 | Harwood | 358/28 |
| 4,718,030 | 1/1988 | Tsutsumi | 364/721 |

FOREIGN PATENT DOCUMENTS 2544106 10/1984 France .
2160375 12/1985 United Kingdom .

Primary Examiner—Gary V. Harkcom
Assistant Examiner—Tan V. Mai
Attorney, Agent, or Firm—Thomas L. Peterson

[57] ABSTRACT

This circuit simultaneously provides the sine- and cosine-function values for one and the same digital argument from any of the quadrants of the sine and cosine functions. Stored in the two halves of a read-only memory are the unsigned function values of the first half-quadrant of the cosine function in the direction of increasing arguments and of the second half-quadrant in the direction of decreasing arguments, respectively. The number of bits of the argument is greater than the number of bits of the function values, including the sign bit, by two. By skillful inversion of the addresses and the read-out function values using multiple-inverter blocks in conjunction with multiple-switch units sine- and cosine-function values can be generated for all four quadrants both in the one's and in the two's complement code. If the argument is formed by an accumulator fed with the frequency determining digital word, the digital circuit is a digital sine-/cosine-wave oscillator.

10 Claims, 3 Drawing Sheets

4,827,442

DIGITAL CIRCUIT FOR SIMULTANEOUSLY GENERATING DIGITAL SINE- AND COSINE-FUNCTION VALUES

BACKGROUND OF THE INVENTION

The present invention relates to a digital circuit for simultaneously generating digital sine- and cosine-function values for one and the same digital argument from any of the four quadrants of these functions.

In the journal "Electronik," 1971, No. 5, page 170, it is described how digital sine-function values can be stored in read-only memories with high resolution and accuracy, namely by using the trigonometric function which holds for the sine of the sum of two angles: $\sin(x+y) = \sin(x)\cos(y) + \cos(x)\sin(y)$.

Since the sine function is approximately equal to the angle for angle values between 0° and about 5°, and the cosine function for angle values between 85° and 90°, read-only-memory space can be saved.

SUMMARY OF THE INVENTION

However, the present invention does not deal with the digital generation of digital sine or cosine values but is concerned with the simultaneous generation of sine- and cosine-function values for one and the same digital argument over the entire argument range from 0° to 360°, i.e., for arguments from any of the four quadrants of these trigonometric functions.

The object of the invention is to provide a read-only-memory-space-saving arrangement and to optimize the accuracy of the generated sine- and cosine-function values both with respect to their own quantizing error and with respect to the error caused by the digital representation of the argument. The latter requirement results in the feature of the invention that, if the argument is present in the unsigned pure binary code, the number of bits of the argument must be greater than the number of bits of the sine- and cosine-function values, including the sign bit, by 2. If these two numbers of bits were only equal, the error, because of the address quantization, would be pi ($\pi$) times that caused by the output quantization.

BRIEF DESCRIPTION OF THE DRAWINGS

The invention will now be explained in more detail with reference to the accompanying drawings, in which.

DETAILED DESCRIPTION OF SEVERAL PREFERRED EMBODIMENTS

Figure 1:
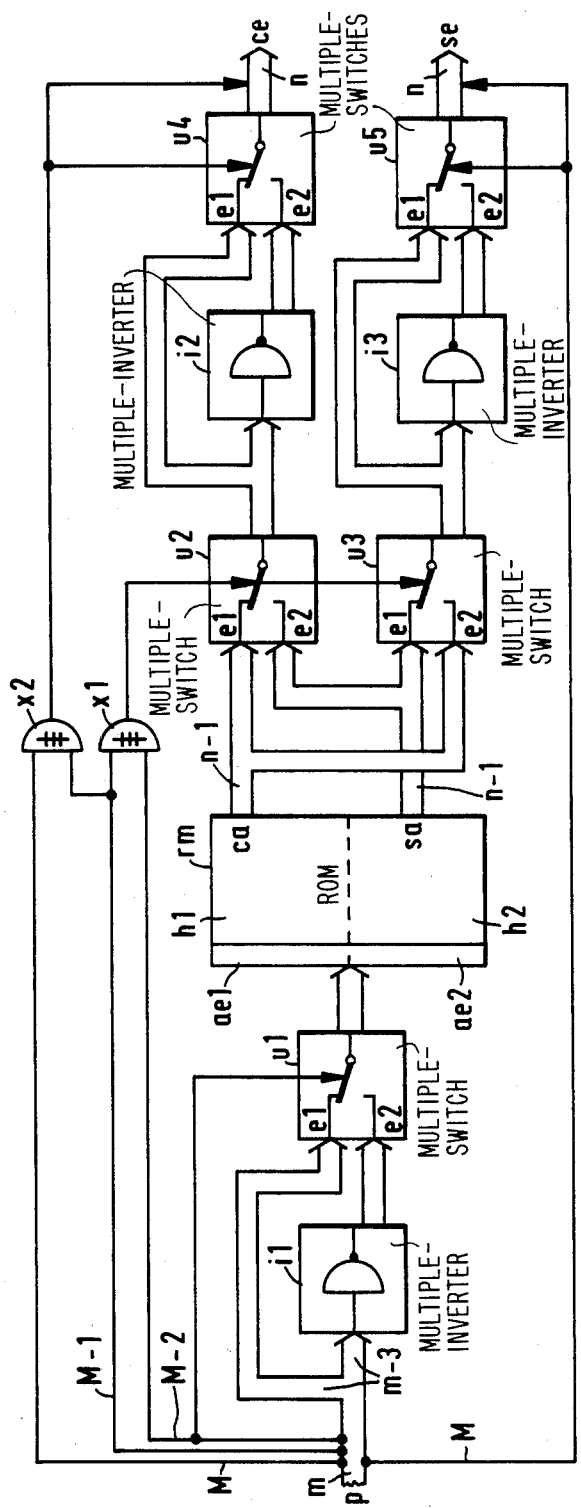
FIG. 1 is a block diagram of an embodiment of the invention.

In the embodiment shown in the block diagram of FIG. 1, the digital argument p is present in the unsigned pure binary code, and its number of bits m is greater than the number of bits n of the sine- and cosine-function values, including the sign bit, by 2, as mentioned above. Of the m bits, only the m-3 least significant bits are fed to the first multiple-inverter block i1, whose individual inverters invert the bit signals bit by bit.

The multiple-inverter block i1 is followed by the first multiple-switch unit u1, whose first input e1 and second input e2 are connected, respectively, to the input and the output of the first multiple-inverter block i1, so that depending on the switch position, either the m-3 bits of the argument p or the bit-by-bit inversion thereof is transferred to the output of the first multiple-switch unit u1. The control input of the latter is suppled with the third most significant bit signal M-2 of the argument p.

The output of the first multiple-switch unit u1 is connected to the address inputs ae1, ae2 of the two halves h1, h2 of the read-only memory rm. The first memory half h1 contains the unsigned function values of the first half-quadrant of the cosine function in the direction of increasing arguments p, and the second memory half h2 contains those of the second half-quadrant of the cosine function in the direction of decreasing arguments p, the values being shifted with respect to each other by half the value of their least significant bits; the first memory half h1 thus holds the cosine-function values from 0° to 45°, and the second memory half h2 holds the cosine-function values from 90° to 45°. Associated with the first and second memory halves h1, h2 are the cosine output ca and the sine output sa, respectively.

As the inventors found out, the sine- and cosine-function values for each argument p can be simultaneously formed from the function values of the two half-quadrants. To do this, the memory halves h1, h2 are read half-quadrant by half-quadrant either in the direction of increasing arguments or in the direction of decreasing arguments, i.e., "forward" or "backward," which is implemented by the above-described address inversion using the first multiple-inverter block i1 and the first multiple-switch unit u1.

This will now be explained with the aid of a few examples. At values of the argument p in the first half-quadrant (p=0° to 45°), digital signals for the decimal cosine values 0.966 and $(\frac{1}{2})3^{\frac{1}{2}}$ (these are the actual values) are read successively from the memory half h1 at the cosine output ca, and digital signals for the decimal cosine values 0.259 and $\frac{1}{2}$ (these values correspond to actual cosine arguments of 75° and 60°, respectively, but are also the actual sine values) are read in this order from the memory half h2 at the sine output sa.

At values of the argument p in the second half-quadrant (p=45° to 90°), these values are transferred to the address inputs ae1, ae2 of the read-only memory rm only in their modulo-45° versions, because only m-3 low-order bits of the argument p are used, i.e., 60° becomes 15°, and 75° becomes 30°. The first multiple-inverter block i1 inverts these addresses bit by bit, so that 15° becomes 30°, and 30° becomes 15°. The cosine output ca thus provides digital signals for the decimal cosine values $(\frac{1}{2})3^{\frac{1}{2}}$ and 0.966, while the sine output sa provides digital signals for the cosine values $\frac{1}{2}$ and 0.259.

In the third half-quadrant (p=90° to 135°, the exemplary values of the argument p=105° and 120° become 15° and 30° again because of modulo 45°, and since the addresses are transferred to the read-only memory rm in uninverted form, the outputs of the read-only memory provide the same function values as in the example of the first half-quadrant. In the fourth half-quadrant, the conditions described for the second half-quadrant exist for the arguments 150° and 165°. The same applies analogously to the fifth and seventh half-quadrants and to the sixth and eighth half-quadrants.

The output of the first memory half h1 is coupled to the first input e1 of the second multiple-switch unit u2 and to the second input e2 of the third multiple-switch unit u3, while the output of the second memory half h2 is coupled to the second input e2 of the second multiple-switch unit u2 and to the first input e1 of the third multiple-switch unit u3, the individual bit leads of these multiple outputs again being connected to the associated bit leads of these multiple inputs. The control inputs of the two multiple-switch units u2, u3 are connected to the output of the first exclusive-OR gate x1, whose first and second inputs are supplied, respectively, with the next most significant bit signal M-1 and the third most significant bit signal M-2 of the argument p.

Since, on the one hand, the three most significant bits M, M-1, M-2 of the argument effect the assignment to the 8 half-quadrants, and their signals can assume the binary values between 000 and 111 (000 corresponds to the first half-quadrant, and 111 to the eighth half-quadrant), and since, on the other hand, the positions of all switches shown in FIGS. 1 to 4 correspond to a logic 0 at the respective control input, the two multiple-switch units u2, u3 are switched from the position shown to the other position in the second and third half-quadrants and in the sixth and seventh half-quadrants. Thus, during these half-quadrants, the output of the second multiple-switch unit u2 delivers the output signal of the second memory half h2, not that of the first memory half h1, and the output of the third multiple-switch unit u3 delivers the output signal of the first memory half h1, not that of the second memory half h2.

In the first half-quadrant, the above exemplary values 0.966 and $(\frac{1}{2})3^{\frac{1}{2}}$ are thus transferred to the output of the second multiple-switch unit u2, and the exemplary values 0.259 and $\frac{1}{2}$ to the output of the third multiple-switch unit u3. In the second half-quadrant, the exemplary values $\frac{1}{2}$ and 0.259 appear at the output of u2, and the exemplary values $(\frac{1}{2})3^{\frac{1}{2}}$ and 0.966 at the output of u3. These, however, are the actual cosine values for the arguments 60° and 75° (in the case of u2) and the actual sine values for the arguments 60° and 75° (in the case of u3).

In the third half-quadrant, the output of u2 provides the exemplary values 0.259 and $\frac{1}{2}$ (these are the actual, absolute cosine values of 105° and 120°), and the output of u3 provides the exemplary values 0.966 and $(\frac{1}{2})3^{\frac{1}{2}}$ (these are the actual sine values of 105° and 120°).

In the fourth half-quadrant, the output of u2 provides the exemplary values $(\frac{1}{2})3^{\frac{1}{2}}$ and 0.966 (these are the actual, absolute cosine values of 150° and 165°), and the output of u3 provides the exemplary values $\frac{1}{2}$ and 0.259 (these are the actual sine values of 150° and 165°).

The output of the second multiple-switch unit u2 is fed to the input of the second multiple-inverter block i2 and to the first input e1 of the fourth multiple-switch unit u4, while the output of the third multiple-switch unit u3 is fed to the input of the third multiple-inverter block i3 and to the first input e1 of the fifth multiple-switch unit u5. The control input of the fourth multiple-switch unit u4 is connected to the output of the second exclusive-OR gate x2, whose first and second inputs are supplied, respectively, with the most significant bit signal M and the next most significant bit signal M-1 of the argument p.

The output of the fourth multiple-switch unit u4, together with the output of the second exclusive-OR gate x2, which serves as the sign signal, forms the signed cosine function value ce in the one's complement code. This signal has the required n bits.

The control input of the fifth multiple-switch unit u5 is fed with the most significant bit signal M of the argument p, which also forms the sign bit of the signed sine-function value se in the one's complement code; it is added to the output signal of the fifth multiple-switch unit u5, just as the output of the second exclusive-OR gate x2 is added to the output of the fourth multiple-switch unit u4, so that the signed sine-function value se has n bits, too.

Thus, the output of the second multiple-switch unit u2 is inverted by the formation of the exclusive OR of the most significant bit signal M with the next most significant bit signal M-1 during the third to the sixth half-quadrant, and at the same time, the logic 1 occurring in the inverted signal is added as the sign bit to the cosine-function value ce; this logic 1 characterizes a negative function value ce, as is usual in the one's complement code.

For the fifth multiple-switch unit u5 and the sine-function value se, similar considerations apply: during the fifth to the eighth half-quadrant, the output of the third multiple-switch unit u3 is transferred in inverted form to the output of the fifth multiple-switch unit u5, and the most significant bit M is used as the sign bit of the sine-function value se; in the fifth to the eighth half-quadrant, however, the sine function is negative per definition.

In the above examples, the above absolute values of the cosine from the third and fourth half-quadrants are supplemented by the bit characterizing the negative value and are inverted bit by bit, so that the output function values ce are decimal −0.259 and −$\frac{1}{2}$ in the third half-quadrant, and −$(\frac{1}{2})3^{\frac{1}{2}}$ and −0.966 in the fourth half-quadrant.

In the arrangement of FIG. 1, the cosine- and sine-function values ce, se follow from the mathematical functions +cos(p), +sin(p). It is readily possible to generate three further pairs, +cos(p), −son(p); −cos(p), +sin(p); −cos(p), −son(p). For −cos(p), an inverter must be interposed between the output of the second exclusive-OR gate x2 and the control input of the fourth multiple-switch unit u4. Its output must also serve as the sign bit of the output function signal ce. Analogously, for −son(p), the bit signal M must be inverted, applied to the control input of the fifth multiple-switch unit u5, and used as the sign bit of the output function signal se.

Figure 2:
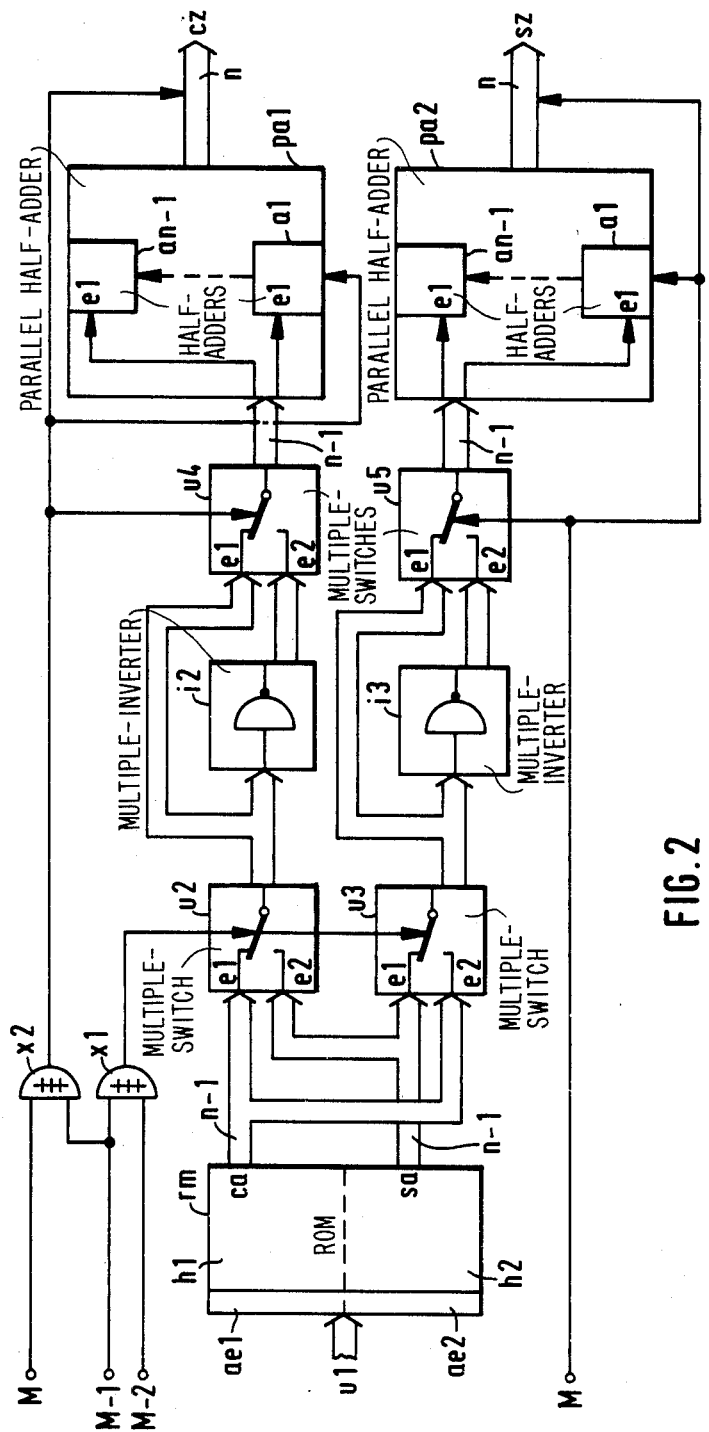
FIG. 2 is a block diagram of a development of the arrangement of FIG. 1.

FIG. 2 is a block diagram showing a development of part of the arrangement of FIG. 1 with which the function values in the one's complement code can be changed into function values in the two's complement code (the parts preceding the read-only memory rm in FIG. 1 have been omitted but must be thought of as being present).

In FIG. 2, the output of the fourth multiple-switch unit u4 is followed by the first parallel half-adder pal, in which the first inputs e1 of the individual half-adders a1, an-1 are connected to the associatd bit leads of the outputs of the individual switches in the fourth multiple-switch unit u4. The second input of the least significant half-adder a1 is connected to the output of the second exclusive-OR gate x2, while the second inputs of the other half-adders are connected to the carry output of the respective next less significant half-adder; this is indicated in FIG. 2 by the arrowhead on the dashed line. The outputs of the half-adders, together with the output of the second exclusive-OR gate x2 as the sign bit, provide the cosine-function values cz in the two's complement. These function values, too, have n bits, as required.

The output of the fifth multiple-switch unit u5 is followed by the second parallel half-adder pa2, in which the first inputs e1 of the individual half-adders a1, an-1 are connected to the associated bit leads of the individual switches in the fifth multiple-switch unit u5. The second input of the least significant half-adder a1 is fed with the most significant bit signal M of the argument p, while the second inputs of the other half-adders are connected to the carry output of the respective next less significant half-adder. The outputs of the individual half-adders, together with the most significant bit signal M of the argument p as the sign bit, provide the sine-function values sz in the two's complement.

Figure 3:
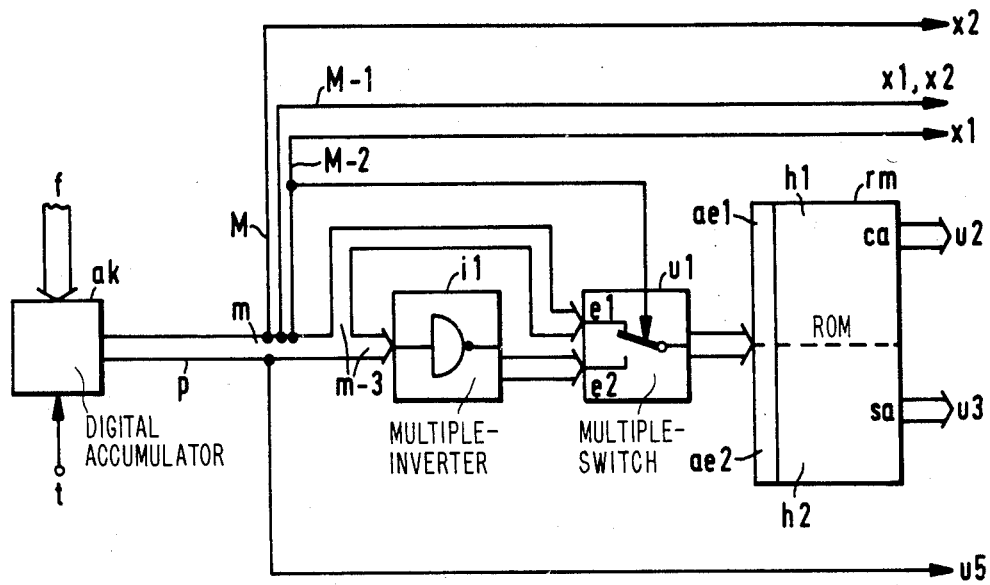
FIG. 3 is a partial block diagram of an arrangement obtained by expanding the arrangements of FIGS. 1 and 2 into a digital sine-/cosine-wave oscillator.

FIG. 3 shows schematically how the arrangements of FIGS. 1 and 2 can be expanded into digital sine-/cosine-wave oscillators. To this end, it is only necessary to form the arguments p by means of the digital accumulator ak, whose input is fed with the digital word f determining the frequency of the oscillator, and in which summation takes place at the frequency of the clock signal t, i.e., the clock signal t controls the summation.

As is well known, a digital accumulator is an adder followed by a buffer. The first input of the adder is fed with a digital signal, while the second input is connected to the output of the buffer, which has its input connected to the output of the adder. On each pulse of the clock signal, the sum is thus formed from the digital word applied at the first input of the adder and the result of the previous addition. If, for example, a signal corresponding to decimal one is applied at the input of the adder, the one will be added on each pulse of the clock signal, so that the decimal number sequence 1, 2, 3 . . . is obtained. In the case of the oscillator of FIG. 3, the frequency-determining digital word f is summed, so that a constantly changing argument p appears at the output of the accumulator ak. If necessary, low-order bits of the accumulator's output signal may remain unused.

Such oscillators are preferably used in quadrature modulators and demodulators, where a signal has to be multiplied by another signal and by a signal differing in phase from this other signal by exactly 90°. A preferred application of such oscillators is in digital chrominance demodulators of digital color-television receivers or video recorders.

Figure 4:
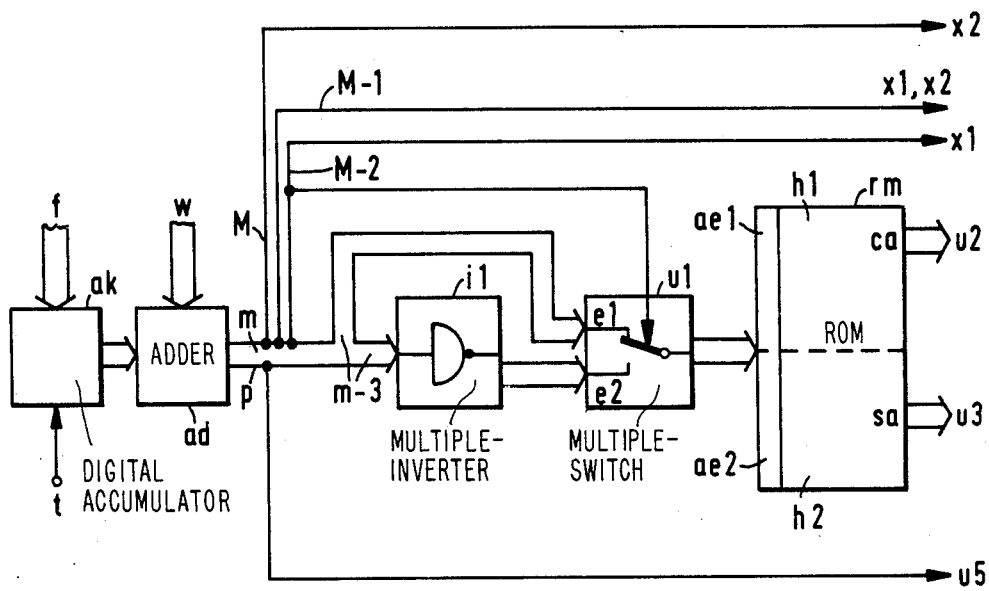
FIG. 4 is a partial block diagram of a development of the arrangement of FIG. 3.

In FIG. 4, a development of the oscillator of FIG. 3, the accumulator ak is followed by the adder ad, whose other input is supplied with the phase digital word w. To adjust the tint phase of the chroma signal, for example, the tint value, which is different from zero only during the keying pulse, is fed to the adder ad during the keying pulse.

In FIGS. 3 and 4, those parts of FIGS. 1 and 2 which follow the read-only memory rm have been omitted for simplicity; these parts must be thought of as being present, however.

What was said above about the function pairs +cos(p), sin(p); +cos(p), −son(p); cos(p), +sin(p); −cos(p), −son(p) applies analogously to the arrangements of FIGS. 2 to 4.

The invention is preferably implemented as a semiconductor monolithic integrated circuit; it is especially suited for implementation in insulated-gate field-effect transistor technology (MOS technology).

What is claimed is:
1. A digital circuit for simultaneously generating digital values of sine and cosine functions for a single digital argument representing a phase angle in any of the four quadrants of the sine and cosine functions, comprising:

a read-only memory having a first memory half which contains unsigned values for the cosine function in the first half-quadrant of the cosine function in the direction of increasing arguments and a second memory half which contains unsigned values for the cosine function in the second half-quadrant of the cosine function in the direction of decreasing arguments, said values in said first memory half corresponding to unsigned values for the sine function in the second half quadrant of the sine function in the direction of decreasing arguments and said values in said second memory half corresponding to unsigned values for the sine function in the first half-quadrant of the sine function in the direction of increasing arguments, said values of said cosine function having n bits, the digital arguments being present in the unsigned binary code, each of said digital arguments having m bits, wherein m is greater than n;

a first multiple inverter block having a plurality of inverters each of which is provided a respective bit signal of the m-3 least significant bits of a digital argument signal input to said digital circuit;

a first multiple switch unit having a first input coupled to receive the input of said first multiple inverter block, a second input coupled to receive the output of said first multiple inverter block, and a control input coupled to receive the third most significant bit signal of said digital argument signal, the output of said first multiple switch being connected to the address input of said first and second memory halves so that as said argument signal increases, the cosine function values in said first memory half are read out in decreasing order and the cosine function values in said second memory half are read out in increasing order;

a second multiple switch unit having a first input connected to the output of said first memory half and a second input connected to the output of said second memory half;

a third multiple switch unit having a first input connected to the output of said second memory half and a second input connected to the output of said first memory half;

a first exclusive-OR gate having a first input connected to receive the second most significant bit signal of said argument signal, a second input connected to receive the third most significant bit signal of said argument signal, and an output connected to the control inputs of said second and third multiple switch units;

a second multiple inverter block connected to the output of said second multiple switch unit;

a third multiple inverter block connected to the output of said third multiple switch unit;

a fourth multiple switch unit having a first input connected to the input of said second multiple inverter block and a second input connected to the output of said second multiple inverter block, the output of said fourth multiple switch unit providing an unsigned digital cosine value;

a fifth multiple switch unit having a first input connected to the input of said third multiple inverter block and a second input connected to the output of said third multiple inverter block, the output of said fifth multiple switch unit providing an unsigned digital sine value; and a second exclusive-OR gate having a first input connected to receive the most significant bit signal of said argument signal, a second input connected to receive the second most significant bit signal of said argument signal, and an output which is connected to the control input of said fourth multiple switch unit and added as the sign bit to the output of said fourth multiple switch unit to form the signed cosine value in the one's complement code, the most significant bit of said argument signal being supplied to the control input of said fifth multiple switch unit and added as the sign bit to the output of said fifth multiple switch unit to form the signed sine value in the one's complement code.

2. The digital circuit as defined in claim 1, wherein the number of bits m of said argument exceeds the number of bits n of said function by two.

3. A digital circuit as defined in claim 1 or 2 wherein said digital circuit is implemented with monolithic integrated semiconductor technology.

4. A digital circuit for simultaneously generating digital values of sine and cosine functions for a single digital argument representing a phase angle in any of the four quadrants of the sine and cosine functions, comprising:
- a read-only memory having a first memory half which contains unsigned values for the cosine function in the first half-quadrant of the cosine function in the direction of increasing arguments and a second memory half which contains unsigned values for the cosine function in the second half-quadrant of the cosine function in the direction of decreasing arguments, said values in said first memory half corresponding to unsigned values for the sine function in the second half quadrant of the sine function in the direction of decreasing arguments and said values in said second memory half corresponding to unsigned values for the sine function in the first half-quadrant of the sine function in the direction of increasing arguments, said values of said cosine function having n bits, the digital arguments being present in the unsigned binary code, each of said digital arguments having m bits, wherein m is greater than n;
- a first multiple inverter block having a plurality of inverters each of which is provided a respective bit signal of the m-3 least significant bits of a digital argument signal input to said digital circuit;
- a first multiple switch unit having a first input coupled to receive the input of said first multiple inverter block, a second input coupled to receive the output of said first multiple inverter block, and a control input coupled to receive the third most significant bit signal of said argument signal, the output of said first multiple switch being connected to the address input of said first and second memory halves so that as said argument signal increases, the cosine function values in said first memory half are read out in decreasing order and the cosine function values in said second memory half are read out in increasing order;
- a second multiple switch unit having a first input connected to the output of said first memory half and a second input connected to the output of said second memory half;
- a third multiple switch unit having a first input connected to the output of said second memory half and a second input connected to the output of said first memory half;
- a first exclusive-OR gate having a first input connected to receive the second most significant bit signal of said argument signal, a second input connected to receive the third most significant bit signal of said argument signal, and an output connected to the control inputs of said second and third multiple switch units;
- a second multiple inverter block connected to the output of said second multiple switch unit;
- a third multiple inverter block connected to the output of said third multiple switch unit;
- a fourth multiple switch unit having a first input connected to the input of said second multiple inverter block and a second input connected to the output of said second multiple inverter block, the output of said fourth multiple switch unit providing an unsigned digital cosine value;
- a fifth multiple switch unit having a first input connected to the input of said third multiple inverter block and a second input connected to the output of said third multiple inverter block, the output of said fifth multiple switch unit providing an unsigned digital sine value;
- a second exclusive-OR gate having a first input connected to receive the most significant bit signal of said argument signal, a second input connected to receive the second most significant bit signal of said argument signal, and an output which is connected to the control input of said fourth multiple switch unit, the most significant bit of said argument signal being supplied to the control input of said fifth multiple switch unit;
- a first parallel half-adder circuit comprising a plurality of first half-adders, said first parallel half-adder circuit being connected to the output of said fourth multiple switch unit, the output of said second exclusive-OR gate being added as the sign bit to the output of said first parallel half-adder circuit to form the signed cosine value in two's complement code; and
- a second parallel half-adder circuit comprising a plurality of second half-adders, said second parallel half-adder circuit being connected to the output of said fifth multiple switch unit, the most significant bit signal of said argument signal being added as the sign bit to the output of said second parallel half-adder circuit to form the signed sine value in the two's complement code.

5. A digital circuit as defined in claim 4, wherein:
said fourth multiple switch unit comprises a plurality of switches and said fifth multiple switch unit comprises a plurality of switches;
each of said first half-adders has a first input connected to a respective one of said switches of said fourth multiple switch unit;
the one of said first half-adders that receives the least significant bit output from said fourth multiple switch unit has a second input connected to receive the output of said second exclusive-OR gate, and each of the remaining of said first half-adders has a second input connected to receive a carry output from its adjacent first half-adder;

each of said second half-adders has a first input connected to a respective one of said switches of said fifth multiple switch unit; and the one of said second half-adders that receives the least significant bit output from said fifth multiple switch unit has a second input connected to receive the most significant bit signal of said argument, and each of the remaining of said second half-adders has a second input connected to receive a carry output from its adjacent second half-adder.

6. A digital sine-/cosine-wave oscillator that generates sine and cosine functions, comprising:

a read-only memory having a first memory half which contains unsigned values for the cosine function in the first half-quadrant of the cosine function in the direction of increasing arguments and a second memory half which contains unsigned values for the cosine function in the second half-quadrant of the cosine function in the direction of decreasing arguments, said values in said first memory half corresponding to unsigned values for the sine function in the second half quadrant of the sine function in the direction of decreasing arguments and said values in said second memory half corresponding to unsigned values for the sine function in the first half-quadrant of the sine function in the direction of increasing arguments, said values of said cosine function having n bits, the digital arguments being present in the unsigned binary code, each of said digital arguments having m bits, wherein m is greater than n;

a digital accumulator for producing a digital argument signal, said digital accumulator having an input that receives a digital word which determines the frequency of said oscillator, the summation of said accumulator being controlled by a clock signal;

a first multiple inverter block connected to said accumulator, said first multiple inverter block having a plurality of inverters each of which is provided a respective bit signal of the m-3 least significant bits of said digital argument signal;

a first multiple switch unit having a first input coupled to receive the input of said first multiple inverter block, a second input coupled to receive the output of said first multiple inverter block, and a control input coupled to receive the third most significant bit signal of said argument signal, the output of said first multiple switch being connected to the address input of said first and second memory halves so that as said argument signal increases, the cosine function values in said first memory half are read out in decreasing order and the cosine function values in said second memory half are read out in increasing order;

a second multiple switch unit having a first input connected to the output of said first memory half and a second input connected to the output of said second memory half;

a third multiple switch unit having a first input connected to the output of said second memory half and a second input connected to the output of said first memory half;

a first exclusive-OR gate having a first input connected to receive the second most significant bit signal of said argument signal, a second input connected to receive the third most significant bit signal of said argument signal, and an output connected to the control inputs of said second and third multiple switch units;

a second multiple inverter block connected to the output of said second multiple switch unit;

a third multiple inverter block connected to the output of said third multiple switch unit;

a fourth multiple switch unit having a first input connected to the input of said second multiple inverter block and a second input connected to the output of said second multiple inverter block, the output of said fourth multiple switch unit providing an unsigned digital cosine value;

a fifth multiple switch unit having a first input connected to the input of said third multiple inverter block and a second input connected to the output of said third multiple inverter block, the output of said fifth multiple switch unit providing an unsigned digital sine value; and a second exclusive-OR gate having a first input connected to receive the most significant bit signal of said argument signal, a second input connected to receive the second most significant bit signal of said argument signal, and an output which is connected to the control input of said fourth multiple switch unit and added as the sign bit to the output of said fourth multiple switch unit to form the signed cosine value in the one's complement code, the most significant bit of said argument signal being supplied to the control input of said fifth multiple switch unit and added as the sign bit to the output of said fifth multiple switch unit to form the signed sine value in the one's complement code.

7. A digital sine-/cosine-wave oscillator that generates sine and cosine functions, comprising:

a read-only memory having a first memory half which contains unsigned values for the cosine function in the first half-quadrant of the cosine function in the direction of increasing arguments and a second memory half which contains unsigned values for the cosine function in the second half-quadrant of the cosine function in the direction of decreasing arguments, said values in said first memory half corresponding to unsigned values for the sine function in the second half quadrant of the sine function in the direction of decreasing arguments and said values in said second memory half corresponding to unsigned values for the sine function in the first half-quadrant of the sine function in the direction of increasing arguments, said values of said cosine function having n bits, the digital arguments being present in the unsigned binary code, each of said digital arguments having m bits, wherein m is greater than n;

a digital accumulator having an input that receives a digital word which determines the frequency of said oscillator, the summation of said accumulator being controlled by a clock signal, the output of said accumulator being a digital argument signal that represents an angle;

a first multiple inverter block coupled to said accumulator, said first multiple-inverter block having a plurality of inverters each of which is provided a respective bit signal of the m-3 least significant bits of said digital argument signal;

a first multiple switch unit having a first input coupled to receive the input of said first multiple inverter block, a second input coupled to receive the output of said first multiple inverter block, and a control input coupled to receive the third most significant bit signal of said argument signal, the output of said first multiple switch being connected to the address input of said first and second memory halves so that as said argument signal increases, the cosine function values in said first memory half are read out in decreasing order and the cosine function values in said second memory half are read out in increasing order;

a second multiple switch unit having a first input connected to the output of said second memory half and a second input connected to the output of said first memory half;

a third multiple switch unit having a first input connected to the output of said second memory half and a second input connected to the output of said first memory half;

a first exclusive-OR gate having a first input connected to receive the second most significant bit signal of said argument signal, a second input connected to receive the third most significant bit signal of said argument signal, and an output connected to the control inputs of said second and third multiple switch units;

a second multiple inverter block connected to the output of said second multiple switch unit;

a third multiple inverter block connected to the output of said third multiple switch unit;

a fourth multiple switch unit having a first input connected to the input of said second multiple inverter block and a second input connected to the output of said second multiple inverter block, the output of said fourth multiple switch unit providing an unsigned digital cosine value;

a fifth multiple switch unit having a first input connected to the input of said third multiple inverter block and a second input connected to the output of said third multiple inverter block, the output of said fifth multiple switch unit providing an unsigned digital sine value;

a second exclusive-OR gate having a first input connected to receive the most significant bit signal of said argument signal, a second input connected to receive the second most significant bit signal of said argument signal, and an output which is connected to the control input of said fourth multiple switch unit, and the most significant bit of said argument signal being supplied to the control input of said fifth multiple switch unit;

a first parallel half-adder circuit comprising a plurality of first half-adders, said first parallel half-adder circuit being connected to the output of said fourth multiple switch unit, the output of said second exclusive-OR gate being added as the sign bit to the output of said first parallel half-adder circuit to form the signed cosine value in two's complement code; and a second parallel half-adder circuit comprising a plurality of second half-adders, said second parallel half-adder circuit being connected to the output of said fifth multiple switch unit, the most significant bit signal of said argument signal being added as the sign bit to the output of said second parallel half-adder circuit to form the signed sine value in the two's complement code.

8. An oscillator as defined in claim 6 or 7 additionally comprising an adder connected between said accumulator and said first multiple inverter block, said adder having an input connected to receive a digital word representing a phase offset to be added to the argument signal output of said accumulator.

9. An oscillator as defined in claim 8 wherein said digital word applied to the input of said adder represents the tint phase of the chroma signal in a digital color television receiver and is supplied to said adder during the keying pulse.

10. A digital circuit for simultaneously generating digital values of sine and cosine functions for a single digital argument comprising m bits that represent a phase angle from any of the four quadrants of the sine and cosine functions, comprising:

a read-only memory having a first memory half which contains unsigned values for the cosine function in the first half-quadrant of the cosine function in the direction of increasing arguments and a second memory half which contains unsigned values for the cosine function in the second half-quadrant of the cosine function in the direction of decreasing arguments, said values in said first memory half corresponding to unsigned values for the sine function in the second half quadrant of the sine function in the direction of decreasing arguments and said values in said second memory half corresponding to unsigned values for the sine function in the first half-quadrant of the sine function in the direction of increasing arguments, said values of said cosine function having n bits, wherein m is greater than n, the digital arguments being present in the unsigned binary code, said read-only memory addressable by the m-3 least significant bits of said argument to provide a pair of digital output values corresponding to the first half-quadrant of the cosine function and the second half-quadrant of the cosine function;

a function selection circuit comprising a plurality of switches and complementing circuits and controlled by the most significant three of said m bits of said argument, said most significant three bits providing one of eight encoded digital values corresponding to the eight half-quadrants of the sine- and cosine-functions, said selection circuit responsive to said eight encoded digital values to:

selectively address said read-only memory with either said m-3 least significant bits or the complement of said m-3 least significant bits;

select the digital outputs of one of the first memory half to provide an intermediate cosine function and select the digital outputs of the other memory half to provide an intermediate sine function;

selectively complement said intermediate cosine function to provide said cosine function output; and selectively complement said intermediate sine function to provide said sine-function output.

* * * * *